3,478,077
SULFONE-CONTAINING ORGANOHALOGENO-
SILANES AND METHOD OF FORMING
Tse C. Wu, Waterford, N.Y., assignor to General Electric
Company, a corporation of New York
No Drawing. Filed Dec. 15, 1966, Ser. No. 601,876
Int. Cl. C07f 7/12, 7/18; C08f 11/04
U.S. Cl. 260—448.2                    7 Claims

ABSTRACT OF THE DISCLOSURE

This invention relates to sulfone-containing organohalogenosilanes of formula:

(1)  $(RSO_2CH_2CH_2)_aSiX_bR'_{4-(a+b)}$ where R is selected from the class consisting of methyl, ethyl, phenyl, and tolyl; R' is selected from the class consisting of lower alkyl, phenyl, and tolyl; X is selected from the class consisting of chlorine, fluorine, bromine, and lower alkoxy; $a$ is from 1 to 2, $b$ is from 1 to 3, and the sum of $a$ and $b$ is no more than 4. Further, this invention relates to a method for forming the material of Formula 1 by oxidation of the corresponding mercapto-containing fluorosilane, with appropriate steps for later converting the X group, when required. Preferably, X is fluorine or chlorine. The novel compounds are used to form sulfone containing organocyclotrisiloxanes which can be formed into high molecular weight elastomeric organopolysiloxanes by homopolymerization or by copolymerization with other cyclopolysiloxanes.

BACKGROUND OF THE INVENTION

The primary building blocks for the formation of methyl-substituted organopolysiloxanes are the various methyl-substituted organochlorosilanes. Such organochlorosilanes have long been known in the art and have been used in a variety of ways to produce the corresponding organopolysiloxanes. While organopolysiloxanes containing sulfone-substituents are also known and are described, for example, in U.S. Patent No. 2,997,457—Kantor, the corresponding sulfone-substituted organochlorosilanes have not previously been prepared. The preparation of such materials would allow the more facile formation of high molecular weight organopolysiloxanes substituted with the sulfone group or of cyclopolysiloxanes formable into these high molecular weight materials.

A number of methods were employed in an attempt to form sulfone-containing organochlorosilanes. However, until the method described and claimed in this invention, none were successful. For example, when 2,4,6,8-tetramethyl-2,4,6,8-tetrakis($\beta$-methylsulfonylethyl)-cyclotetrasiloxane was treated with thionyl chloride in the presence of ferric chloride, according to the following equation:

(2)
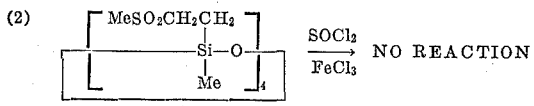

where Me is methyl, there was no reaction, as indicated. When the cyclotetrasiloxane shown in Equation 2 was dissolved in concentrated sulfuric acid and treated with ammonium chloride, or ammonium fluoride, no sulfone-substituted organochlorosilane could be isolated. If any was produced, the solubility of the material in the sulfuric acid solution prevented recovery. Still further, a low molecular weight sulfone-substituted organopolysiloxane was treated with phthaloyl chloride in the presence of ferric chloride, but no sulfone-substituted organodichlorosilane could be recovered. While I do not wish to be bound by theory, it is probable that in each of the reactions described above a competing reaction, that to low molecular weight organopolysiloxanes, was favored, so that such materials were produced rather than the desired sulfone-substituted organohalosilane. By contrast, employing conditions similar to those described above, high purity dimethyl-dichlorosilane can be formed from the corresponding octamethylcyclotetrasiloxane.

It was also attempted to circumvent the inability to produce the desired dichlorosilane, employing the methods described above, by forming a sulfone-substituted organodialkoxysilane. When methyl-$\beta$-methylmercaptoethyldiethoxysilane was treated with hydrogen peroxide in glacial acetic acid, no sulfone-containing diethoxysilane was formed. Similar treatments of the above-mentioned silane with urea peroxide in ethanol, and with monoperphthalic acid in ether, produced none of the desired sulfone-containing diethoxysilane. As with the reactions described above for the treatment of cyclopolysiloxanes, the products obtained in the reactions with the diethoxysilanes were low molecular weight, sulfone-containing organopolysiloxanes. Employing the treatments mentioned above it is apparent that hydrolysis as well as oxidation occur, so that the sulfone-containing organosilanes are not produced. A further attempt was made to produce a sulfone-containing dialkoxysilane by reacting the cyclotetrasiloxane shown in Equation 2 with potassium hydroxide in methanol. No silane product was obtained. The same failure of results was experienced when the cyclotetrasiloxane was treated with potassium hydroxide in methanol and, also when calcium oxide was added to the potassium hydroxide-methanol treatment.

BRIEF SUMMARY OF THE INVENTION

In accordance with the present invention, it has unexpectedly been found that organosilanes substituted with sulfone groups, as shown in Formula 1 can be formed by oxidizing the corresponding organomercapto ethylfluorosilane, and, when desired, converting the fluoro substituents to other reactive groups. The necessary reactions for forming these sulfone-substituted organosilanes are shown below:

(3)
$$Vi_aSiCl_bR'_{4-(a+b)} + aRSH \xrightarrow[\text{light}]{\text{ultraviolet}} (RSCH_2CH_2)_aSiCl_bR'_{4-(a+b)}$$

(4)
$$(RSCH_2CH_2)_aSiCl_bR'_{4-(a+b)} + bHF \longrightarrow$$
$$(RSCH_2CH_2)_aSiF_bR'_{4-(a+b)} + bHCl$$

(5)
$$(RSCH_2CH_2)_aSiF_bR'_{4-(a+b)} + 2aH_2O_2 \xrightarrow{WO_3.H_2O}$$
$$(RSO_2CH_2CH_2)_aSiF_bR'_{4-(a+b)} + 2aH_2O$$

(6)
$$(RSO_2CH_2CH_2)_aSiF_bR'_{4-(a+b)} + \underline{b}SiCl_4 \longrightarrow$$
$$\phantom{xxxx}4$$
$$(RSO_2CH_2CH_2)_aSiCl_bR'_{4-(a+b)} + \underline{b}SiF_4$$
$$\phantom{xxxxxxxxxxxxxxxxxxxxxxxxxxxx}4$$

where Vi is the vinyl group, and R, R', $a$, and $b$, are as previously defined. Thus, the formation of the sulfone-containing organosilane involves the formation of an organomercaptoethylchlorosilane, the conversion of that compound to the corresponding organmercaptoethylfluorosilane, the oxidation of the fluorosilane to the sulfone-containing material, and the conversion of the sulfone-containing organofluorosilane to the sulfone-containing organochlorosilane. The chlorine substituents on the final material can be converted to alkoxy substituents employing the known methods of reaction with an alcohol.

While the reactions set forth above in Equations 3, 4, 5 and 6 are the preferred methods for forming the sulfone-containing material, other reactions are available to produce the desired compounds. For example, the mercapto-containing fluorosilane can be formed by the treatment of a corresponding cyclopolysiloxane with ammonium fluoride and sulfuric acid according to the following equation:

(7)
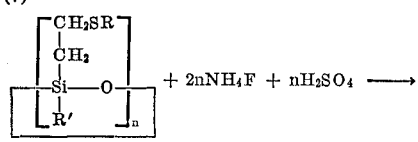
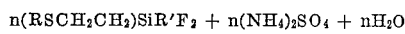

$$n(RSCH_2CH_2)SiR'F_2 + n(NH_4)_2SO_4 + nH_2O$$

where R and R' are as previously defined, and $n$ is an integral number, such as 3 or 4. Obviously, this process is susceptible to the formation only of sulfone-containing organosilanes having two functional substitutents.

Similarly, the mercapto group on the fluorosilane can be converted to the sulfone group employing monoperphthalic acid according to the following equation:

(8)
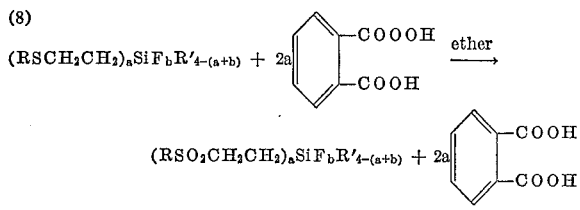

where R, R', $a$, and $b$ are as previously defined. While this method can be employed for oxidizing the mercapto group, it is not as desirable since the monoperphthalic acid, an unstable compound, must be prepared immediately prior to use. By contrast, the hydrogen peroxide and tungstic acid employed according to the reaction described in Equation 5 are readily available at relatively low cost.

Among the materials which can be produced according to the method just described, and falling within Formula 1 are such sulfone-containing silanes as methyl-$\beta$-methylsulfonylethyldiethoxysilane, methyl-$\beta$-methylsulfonylethyldichlorosilane, methyl-$\beta$-methylsulfonylethyldifluorosilane, bis($\beta$-phenylsulfonylethyl)dichlorosilane, ethyl-$\beta$-phenylsulfonylethyldichlorosilane, tolyl - bis($\beta$-ethylsulfonylethyl)chlorosilane, etc.

DETAILED DESCRIPTION OF THE INVENTION

The formation of the mercapto-containing chlorosilane, according to Equation 3 merely involves the addition of the mercaptan across the double bond of a vinyl-substituted chlorosilane. When a gaseous mercaptan is employed, such as methylmercaptan, the gas is bubbled into the chlorosilane, while a liquid mercaptan, such as phenylmercaptan, is preferably added to the vinyl-substituted chlorosilane. Ultraviolet radiation is employed to catalyze the addition of the mercaptan across the vinyl group. The reaction is conducted at a temperature of from about 50 to 100° C. and the addition and reaction require from about 2 to 10 hours to complete. The mercapto-containing silane is then recovered from the reaction mixture by fractionation.

The conversion of the chlorosilane to the fluorosilane, according to Equation 4, is also easily accomplished. Hydrogen fluoride gas is bubbled into the mercaptochlorosilane, in the absence of a solvent, at a temperature near room temperature. No catalyst is necessary. The addition and reaction require from about 2 to 20 hours to complete and the temperature can range up to about 50° C. Again, the mercapto-containing fluorosilane is recovered from the reaction mixture by fractionation. In place of the hydrogen fluoride, other fluoride materials can be employed to convert the chlorosilane. For example, antimony trifluoride, silver fluoride, or mercurous fluoride can be used to displace the chloride substituent by known methods of synthesis.

If the fluorination is to be conducted on a mercapto-containing cyclopolysiloxane with ammonium fluoride, as described in Equation 7, the cyclopolysiloxane is first dissolved in a large quantity of sulfuric acid. For example, there can be about 5 parts of sulfuric acid for each part of the cyclopolysiloxane, by weight. Over a period of several hours, ammonium fluoride is added, in small quantities, to the sulfuric acid solution of the cyclopolysiloxane. The ammonium fluoride is used in excess, for example, about a 50 percent stoichiometric excess based upon the siloxane groups to be converted. In order to keep the reaction within control, the reaction mixture is periodically cooled. Stirring of the reaction mixture is continued, at room temperature, after addition of the ammonium fluoride is completed, and the mercapto-containing fluorosilane is then recovered by extraction, for example, with chloroform. After evaporating the extraction solvent, the material is recovered by fractional distillation.

The reason for forming the fluorosilane, prior to oxidation of the mercapto group, is that the silicon-chlorine bond, is not sufficiently stable to the oxidizing materials required for the conversion of the mercapto group to the sulfone group. The silicon-fluorine bond provides the necessary oxidation resistance. The oxidation, conducted in accordance with Equation 5 is preferably carried out in a water solution. The tungstic acid is dissolved in water in an amount of from about 2 to 5 grams per liter, with the pH adjusted so as to be slightly acidic. The mercapto-containing fluorosilane is placed in the tungstic acid solution in an amount to provide from about 0.5 to 5 grams of the tungsten compound for each mole of the silane. A second solution is formed containing hydrogen peroxide at a concentration of about 30 percent. This hydrogen peroxide solution is added to the mercapto-containing fluorosilane and tungstic acid solution at a rate sufficient to keep the temperature within a range of about 55 to 70° C. The amount of hydrogen peroxide, based upon the fluorosilane, is in the stoichiometric ratio of 2 moles of the peroxide for each mercapto group on the fluorosilane. An excess of up to 5 to 10 percent of the peroxide can be employed. The time of addition, in order to maintain the temperature, is generally in the range of from about 1 to 10 hours. Following the reaction the now sulfone-containing fluorosilane is separated, extracted with a polar solvent, such as ethyl acetate, dried, filtered, the solvent evaporated, and the product material recovered by fractionation.

In the alternate method of oxidizing the mercapto group to the sulfone group, employing monoperphthalic acid, the acid must be prepared just prior to use or must be stored at near 0° C. Thus, the preferable method, when the sulfone-containing silane is to be formed according to Equation 8 is to form the acid and add the silane to it. The monoperphthalic acid can be formed by the reaction of phthalic anhydride and sodium perborate in water, as described in Fieser and Fieser, Advanced Organic Chemistry, Reinhold Publishing Corp., 1961, at page 159.

This oxidation reaction is preferably conducted in a dilute ether solution. There should be sufficient ether to provide a ratio of from about 0.1 to 1 mole of the mercapto-containing fluorosilane to be added for each liter of the ether. The monoperphthalic acid is dissolved in the ether and the silane slowly added to the solution so as to keep the temperature below about 10° C. The addition will require from about 30 minutes to 10 hours. The monoperphthalic acid is employed in the stoichiometric ratio of 2:1, based upon the number of mercapto groups to be oxidized to the sulfone groups, and up to a 5 percent excess can be employed. After addition the reaction mixture is allowed to warm to room temperature.

The by-product phthalic acid which is formed in the reaction is insoluble in the ether solvent and, on completion of the reaction, the reaction mixture is filtered to remove the generated phthalic acid. The solvent is then evaporated from the solution, the residue dissolved in a polar solvent, such as ethyl acetate, and the solution again filtered to remove any remaining phthalic acid. The solvent is then evaporated and the residue fractionated to recover the product fluorosilane.

Following formation of the sulfone-containing fluorosilane, by any of the methods described above, the fluorosilane can be converted to the corresponding chlorosilane by reaction with silicon tetrachloride. This reaction can be carried out without a solvent, employing the silicon tetrachlorde in an excess of from 25 to 150 percent, based upon the stoichiometric requirements. No catalyst is necessary for the reaction, but a trialkylamine can be employed. Among the useful trialkylamines are tri-n-propylamine, and tri-butylamine, in amounts up to 0.1 percent, by weight, based upon the weight of the sulfone-containing fluorosilane. The order of addition of the components is immaterial and the reaction is preferably conducted at reflux, under a dry atmosphere. Refluxing is continued until gas evolution subsides, which generally requires from about 2 to 5 hours. The resulting reaction mixture is then fractionated to recover the desired chlorosilane.

When an alkoxy-substituted sulfone-containing silane according to Formula 1 is desired, the chlorosilane produecd according to Equation 6 can be reacted with the corresponding alcohol, preferably under anhydrous conditions. This reaction can be conducted at from room temperature to the decomposition temperature of the reactants.

The following examples will more clearly illustrate the process of the present invention and the method of forming the products of the present invention. These examples should not be considered as limiting in any way the full scope of the invention as covered by the appended claims. All parts in these examples are by weight.

Example 1

This example illustrates the preparation of methyl-β-methylmercaptoethyldichlorosilane. The method employed is similar to that described in U.S. Patent No. 2,997,457—Kantor. A reaction vessel was fitted with a Dry Ice-acetone condenser, a gas-inlet line, a stirrer, and a source of ultraviolet radiation. A quantity of 471 parts of methylvinyldichlorosilane was placed in the reaction vessel and methylmercaptan was slowly added over a period of about 8 hours, while subjecting the reaction mixture to the ultraviolet radiations. The temperature of the reaction mixture gradually rose to 85° C., but subsided and was maintained at about 75° C. An increase in the volume of the material in the reaction vessel was noted. Nitrogen was bubbled through the solution to remove any unreacted, excess mercaptan and the residue was fractionated in a Todd column to yield 465 parts, 74 percent based upon the theoretical, of the mercapto-containing dichlorosilane of formula:

(9)      $(MeSCH_2CH_2)SiMeCl_2$ where Me is methyl. This material had a boiling point of 197° C. A sample was analyzed for hydrolyzable chlorine content and was found to have 37.62 percent, corresponding favorably with the theoretical value of 37.48 percent.

Example 2

In this example the preparation of a mercapto-containing fluorosilane according to Equation 4 is illustrated. A reaction vessel was equipped with a stirrer, an inlet tube resistant to hydrogen fluoride, a similar outlet tube leading successively, to a safety trap, a Dry Ice trap, a sodium hydroxide trap, and a water scrubber. A quantity of 3419 parts of methyl-β-methylmercaptoethyldichlorosilane, produced according to the procedure described in Example 1, was placed into the reaction vessel. A quantity of 724 parts of hydrogen fluoride gas was bubbled through the mercapto-containing chlorosilane over a period of about 8 hours and a check of the reaction mixture, by vapor phase chromatography, then showed a virtually complete reaction.

The reaction mixture was fractionated and a quantity of 2560 parts of material boiling at 142–148° C. was collected. This represented a 90.5 percent yield of the product having the formula:

(10)      $(MeSCH_2CH_2)SiMeF_2$ where Me is methyl, which corresponds to the product of Formula 4 where R is methyl, R′ is methyl, a is 1, and b is 2.

Example 3

This example illustrates the production of a sulfone-containing difluorosilane according to the reaction of Equation 5. A reaction vessel was fitted with a stirrer and an addition vessel. A mixture was formed in the reaction vessel consisting of 1625 parts of an aqueous solution containing 5 parts of tungstic acid, adjusted to a pH of 5.7, and 781.5 parts of methyl-β-methylmercaptoethyldifluorosilane, as produced in Example 2. A quantity of 1133 parts of a 30 percent hydrogen peroxide solution was placed in the addition vessel and added to the silane-tungstic acid solution over a period of about 2 hours, with stirring. The rate was adjusted during the addition to control the temperature of the reaction mixture in the range of 62±2° C. Following addition, stirring was continued for about 6 hours at room temperature. The reaction mixture was tested with starch-iodide paper to show complete consumption of the peroxide.

When stirring was discontinued, two layers were formed, an upper aqueous layer and a lower organic layer. The aqueous layer was extracted twice with ethyl acetate and these extracts were added to the lower organic layer, dried over sodium sulfate, and filtered. The solvent was evaporated from the filtrate and the residue was distilled to yield 602.2 parts, a 64 percent yield based on the theoretical, of the product having the formula:

(11)      $(MeSO_2CH_2CH_2)SiMeF_2$ where Me is methyl, which corresponds to the product of Formula 1 where R is methyl, R′ is methyl, X is fluorine, a is 1, and b is 2. The product had a boiling point of 134–138° C. at 0.04 mm. It solidified, on standing, and had a melting point of 38–40° C.

Example 4

A reaction vessel was equipped with a stirrer and a condenser. Into the reaction vessel were placed 100 parts of silicon tetrachloride and 111 parts of methyl-β-methylsulfonylethyldifluorosilane and the mixture was blanketed with a dry nitrogen atmosphere. With stirring, the mixture was heated slowly and gently refluxed for a period of about 3 hours. During this time a large volume of gas was gradually liberated from the solution. After the gas evolution had subsided, the reaction mixture was distilled to yield 118 parts, a 90 percent yield based upon the theoretical, of a material boiling at 120–124° C. at 0.01 mm. This material had the structure:

(12)      $(MeSo_2CH_2CH_2)SiMeCl_2$ where Me is methyl, which was substantiated by an infrared spectrum. The material of Formula 12 corresponds to Formula 1 where R and R′ are methyl, X is chlorine, a is 1, and b is 2. The hydrolyzable chlorine content of the material of Formula 12 was found to be 33.0 percent, corresponding favorably with the theoretical value of 32.1 percent.

Examples 5–8

Employing the procedures of Examples 2 through 4, the following materials are produced:

(13)      $(MeSo_2CH_2CH_2)_2SiEtCl$ where Me is methyl and Et is ethyl, which corresponds to Formula 1 where R is methyl, R' is ethyl, X is chlorine, a is 2, and b is 1;

(14)  (PhSO$_2$CH$_2$CH$_2$)SiMe$_2$Cl where Ph is phenyl and Me is methyl, which corresponds to Formula 1 where R is phenyl, R' is methyl, X is chlorine, a is 1, and b is 1;

(15)  (EtSO$_2$CH$_2$CH$_2$)SiPhCl$_2$ where Et is ethyl and Ph is phenyl, which corresponds to Formula 1 where R is ethyl, R' is phenyl, X is chlorine, a is 1, and b is 2;

(16)  (MeSO$_2$CH$_2$CH$_2$)SiF$_3$ where Me is methyl, which corresponds to Formula 1 where R is methyl, X is fluorine, a is 1, and b is 3.

Example 9

This example illustrates the production of the mercapto-containing fluorosilane according to Equation 7. A quantity of 637.4 parts of 2,4,6,8-tetramethyl-2,4,6,8-tetrakis(β-methylmercaptoethyl)cyclotetrasiloxane was dissolved in 2460 parts of concentrated sulfuric acid contained in a reaction vessel. The solution was stirred and a quantity of 528.4 parts of ammonium fluoride was added, in small batches, over a period of about 6 hours. The reaction vessel was intermittently cooled in order to control the reaction. After addition was completed, the reaction mixture was stirred for about 2 hours at room temperature.

Chloroform in an amount of 1500 parts was added to the reaction mixture and the new mixture was stirred for about 2 hours in order to extract the desired fluorosilane. The chloroform layer was separated and the extraction process was repeated. The two chloroform extracts were combined and most of the chloroform removed by distillation. The residue was fractionally distilled to yield 246 parts, 33 percent based on the theoretical, of a liquid boiling at 141–143° C. at about 0.06 mm. This product had the same structure as shown in Formula 10.

Example 10

This example illustrates the production of the sulfone-containing fluorosilane according to the reaction of Equation 8. A solution containing 208 parts of monoperphthalic acid in 2100 parts of anhydrous ethyl ether was placed into a reaction vessel equipped with a stirrer, condenser, and addition vessel. The solution was cooled to about 0° C. and 89 parts of methyl-β-methylmercaptoethyldifluorosilane, as produced according to Example 9, was added, slowly, over a period of about 30 minutes. Cooling was continuously applied to the reaction vessel during the addition. The reaction mixture was stirred for an additional 5 hours, while the temperature gradually rose to ambient. Solid phthalic acid formed in the reaction mixture and was removed by filtration. The ether was evaporated from the filtrate and the residue was dissolved in ethyl acetate. The ethyl acetate solution was filtered to remove an additional amount of phthalic acid which formed and the ethyl acetate was evaporated from that filtrate. The residue of the last evaporation was fractionally distilled to yield 60.3 parts, 56 percent based on the theoretical, of a liquid boiling at 103–107° C. at 0.01 mm. and having the same structure as that shown in Formula 11.

Example 11

This example again illustrates the preparation of a sulfone-containing chlorosilane according to Equation 6, employing the sulfone-containing fluorosilane produced according to the procedure of Example 10. A mixture of 86.7 parts of silicon tetrachloride, 96 parts of methyl-β-methylsulfonylethyldifluorosilane, and 0.1 parts of tri-n-propylamine was placed in a reaction vessel equipped with a stirrer and condenser. The mixture in the vessel was blanketed under a dry nitrogen atmosphere. The mixture was slowly heated, with stirring, until gentle reflux, and was kept at this temperature for a period of about 3 hours. A large amount of gas was evolved from the reaction mixture during the heating period, and, after gas evolution ceased, the reaction mixture was fractionally distilled to yield 94.4 parts, 84 percent based on the theoretical, of a liquid boiling at 120–124° C. at 0.01 mm. and consisting of a material having the structure of Formula 12.

Example 12

This example illustrates the preparation of a material of Formula 1 where X is an alkoxy group. A quantity of the material formed in Example 11 is placed in a reaction vessel and heated to a temperature of about 40° C., while maintaining a vacuum of about 50 mm. Over the course of about 1 hour a stoichiometric excess of methanol is added, with stirring. While maintaining the temperature and vacuum, stirring is continued for about 2 hours following completion of the addition. The resulting product is found to have the formula:

(17)  (MeSO$_2$CH$_2$CH$_2$)SiMe(OMe)$_2$ where Me is methyl. This corresponds with the material of Formula 1 where R is methyl, R' is methyl, X is methoxy, a is 1, and b is 2.

Thus, a wide variety of new sulfone-containing functionally substituted organosilanes have been shown by the preceding description. Additionally, a method for forming these silanes has been shown, involving the formation of a mercapto-containing chlorosilane, the conversion of the mercapto-containing chlorosilane to a mercapto-containing fluorosilane, the oxidation of the fluorosilane to a sulfone-containing fluorosilane, and the conversion of the sulfone-containing fluorosilane to a sulfone-containing chlorosilane. As pointed out in the specification, other methods of formation have failed. The direct production of the sulfone-containing material from a chlorosilane cannot be accomplished because of the relative instability of the silicon-chlorine bond to oxidation, as compared with the silicon-fluorine bond. Thus, if a direct oxidation of a mercapto-containing organochlorosilane is attempted in an effort to form the sulfone-containing material, short chain polysiloxanes result. These short chain materials cannot be recovered with sufficient purity in commercially acceptable yields.

The sulfone-containing organochlorosilanes of the present invention can be reacted with sym-tetraorganodisiloxanediols of formula:

(18)  HOR''$_2$Si—O—SiR''$_2$OH where R'' is a monovalent organic substituent to form sulfone-containing organocyclotrisiloxanes, as described and claimed in my copending application, Ser. No. 601,877, filed of even date herewith and assigned to the same assignee as the present invention. These cyclotrisiloxanes, as with other cyclopolysiloxanes known in the prior art, can be formed into high molecular weight, elastomeric organopolysiloxanes, either by homopolymerization or by copolymerization with other cyclopolysiloxanes.

What I claim as new and desire to secure by Letters Patent of the United States is:

1. An organosilane of the formula:

(RSO$_2$CH$_2$CH$_2$)$_a$SiX$_b$R'$_{4-(a+b)}$ where R is selected from the class consisting of methyl, ethyl, phenyl, and tolyl; R' is selected from the class consisting of lower alkyl, phenyl, and tolyl; X is selected from the class consisting of chlorine, fluorine, bromine, and alkoxy; a is from 1 to 2, b is from 1 to 3, and the sum of a and b is no more than 4.

2. The organosilane of claim 1 having the formula:

(MeSO$_2$CH$_2$CH$_2$)SiMeF$_2$ where Me is methyl.

3. The organosilane of claim 1 having the formula:

$$(MeSO_2CH_2CH_2)SiMeCl_2$$

where Me is methyl.

4. Method of forming the organosilane of the formula $(MeSO_2CH_2CH_2)SiMeCl_2$ which comprises:
  (a) adding methylmercaptan across the double bond of methylvinyldichlorosilane to form methyl-β-methylsulfonylethyldichlorosilane;
  (b) treating said methyl-β-methylsulfonylethyldichlorosilane with hydrogen fluoride to form methyl-β-methylmercaptoethyldifluorosilane;
  (c) oxidizing said methyl-β-methylmercaptoethyldifluorosilane with hydrogen peroxide in the presence of tungstic acid to form methyl-β-methylsulfonylethyldifluorosilane; and
  (d) reacting said methyl-β-methylsulfonylethyldifluorosilane with silicon tetrachloride to form the product organosilane.

5. Method for the preparation of the organosilane of claim 1 wherein X is fluorine which comprises oxidizing the mercapto group of a mercapto-containing organofluorosilane of the formula

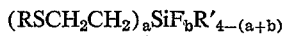
$(RSCH_2CH_2)_aSiF'_bR'_{4-(a+b)}$

6. The method of claim 5 wherein the sulfone-containing organofluorosilane is formed by treating the mercapto-containing organofluorosilane with hydrogen peroxide in the presence of tungstic acid.

7. The method of claim 5 wherein the sulfone-containing organofluorosilane is formed by treatment of the mercapto-containing organofluorosilane with monoperphthalic acid in a solvent solution.

References Cited
UNITED STATES PATENTS

| 2,997,457 | 8/1961 | Kantor | 260—448.2 XR |
| 3,078,292 | 2/1963 | Prober | 260—448.2 |
| 3,128,297 | 4/1964 | Kanner et al. | 260—448.2 |

OTHER REFERENCES

Eaborn, "Organosilicon Compounds," Academic Press (1960), New York, pp. 174, 175, 176, 171, 172.

TOBIAS E. LEVOW, Primary Examiner

P. F. SHAVER, Assistant Examiner

U.S. Cl. X.R.

260—46.5, 448.8